(12) United States Patent
Villacres Mesias et al.

(10) Patent No.: US 10,717,404 B2
(45) Date of Patent: Jul. 21, 2020

(54) SIDE PILLAR AIR CURTAIN GUIDE WITH AIR CURTAIN INSERT HAVING A PLURALITY OF RIBS

(71) Applicant: FORD GLOBAL TECHNOLOGIES, LLC, Dearborn, MI (US)

(72) Inventors: Diego Fabricio Villacres Mesias, Toluca (MX); Alfredo Cuevas Vega, Santiago Tianguistenco (MX); Hector Hernandez Hernandez, Lerma (MX); Robert Ralph Armitage, Jr., Howell, MI (US); Amy Marie Boardman, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/042,588

(22) Filed: Jul. 23, 2018

(65) Prior Publication Data

US 2018/0345897 A1   Dec. 6, 2018

Related U.S. Application Data

(62) Division of application No. 14/846,101, filed on Sep. 4, 2015, now Pat. No. 10,053,046.

(51) Int. Cl.
*B60R 21/213* (2011.01)
*B62D 25/06* (2006.01)
(Continued)

(52) U.S. Cl.
CPC .......... *B60R 21/213* (2013.01); *B60R 21/055* (2013.01); *B60R 21/23138* (2013.01);
(Continued)

(58) Field of Classification Search
CPC .......... B60R 21/055; B60R 2021/0414; B60R 2021/0421; B60R 21/213; B60R 21/0428; B60R 21/232
See application file for complete search history.

(56) References Cited

U.S. PATENT DOCUMENTS 3,819,124 A * 6/1974 Marks ................... G11B 23/037
                                                    242/614
3,871,636 A    3/1975 Boyle
(Continued)

FOREIGN PATENT DOCUMENTS

CN   101412390 A    4/2009
EP   3293058 B1 *  5/2019
(Continued)

OTHER PUBLICATIONS

T. Otsuka, JP 2002-220024 A Machine English Translation, ip.com (Year: 2002).*

(Continued)

*Primary Examiner* — Karen Beck
(74) *Attorney, Agent, or Firm* — David Coppiellie; King & Schickli, PLLC

(57) ABSTRACT

A side pillar air curtain guide includes a main body having a ramp receiver and an air curtain ramp insert connected to the main body. The air curtain ramp receiver insert includes a plurality of ribs projecting from the main body at an acute included angle with the main body.

10 Claims, 14 Drawing Sheets

(51) Int. Cl.
  *B60R 21/055* (2006.01)
  *B60R 21/231* (2011.01)
  *B62D 25/04* (2006.01)
  *B60R 21/04* (2006.01)
  *B60R 21/16* (2006.01)

(52) U.S. Cl.
  CPC ............ *B62D 25/04* (2013.01); *B62D 25/06* (2013.01); *B60R 21/0428* (2013.01); *B60R 2021/0414* (2013.01); *B60R 2021/0421* (2013.01); *B60R 2021/0435* (2013.01); *B60R 2021/161* (2013.01)

(56) References Cited

U.S. PATENT DOCUMENTS

| | | |
|---|---|---|
| 5,536,351 A | 7/1996 | Rheinlander et al. |
| 5,660,426 A | 8/1997 | Sugimori et al. |
| 5,709,407 A | 1/1998 | Stephens et al. |
| 5,992,924 A | 11/1999 | Noritake et al. |
| 6,036,227 A | 3/2000 | Lin et al. |
| 6,068,320 A | 5/2000 | Miyano |
| 6,086,098 A | 7/2000 | Reiter et al. |
| 6,126,231 A | 10/2000 | Suzuki et al. |
| 6,170,861 B1 | 1/2001 | Tietze |
| 6,199,941 B1 | 3/2001 | Takahara et al. |
| 6,264,238 B1 | 7/2001 | MacDonald et al. |
| 6,271,061 B1 | 8/2001 | Frisina et al. |
| 6,305,707 B1 | 10/2001 | Ishiyama et al. |
| 6,387,200 B1 | 5/2002 | Ashmead et al. |
| 6,557,929 B2 | 5/2003 | Fox et al. |
| 6,575,495 B2 | 6/2003 | Calder |
| 6,719,321 B2 | 4/2004 | Yasuhara et al. |
| 6,832,800 B2 | 12/2004 | Hwang et al. |
| 6,843,502 B2 | 1/2005 | Aoki et al. |
| 7,578,521 B2 * | 8/2009 | Downey ............... B60R 13/025 280/730.2 |
| 7,585,009 B2 | 9/2009 | Longwell et al. |
| 7,621,559 B2 | 11/2009 | Seong |
| 7,735,854 B2 * | 6/2010 | Chang ................. B60R 13/0225 280/728.2 |
| 7,934,748 B2 | 5/2011 | Torii |
| 7,963,551 B2 | 6/2011 | Matsuoka et al. |
| 8,172,258 B2 | 5/2012 | Kim et al. |
| 9,254,808 B2 | 2/2016 | Roychoudhury et al. |
| 9,446,732 B2 | 9/2016 | Thomas |
| 2001/0045762 A1 | 11/2001 | Von Holst et al. |
| 2004/0227334 A1 | 11/2004 | Chausset |
| 2005/0173902 A1 * | 8/2005 | Boxey ................. B60R 21/2171 280/730.2 |
| 2006/0267315 A1 * | 11/2006 | White, Jr. ............. B60R 21/213 280/730.2 |
| 2007/0158976 A1 * | 7/2007 | Vo .......................... A42B 3/125 296/187.03 |
| 2007/0213419 A1 | 9/2007 | Cao et al. |
| 2007/0241542 A1 * | 10/2007 | Wallace ................. B60R 13/02 280/730.2 |
| 2008/0197610 A1 | 8/2008 | Downey |
| 2009/0085329 A1 | 4/2009 | Kwak et al. |
| 2010/0219620 A1 | 9/2010 | Jaramillo |
| 2010/0259036 A1 | 10/2010 | Taracko |
| 2013/0249198 A1 | 9/2013 | Hayashi et al. |
| 2015/0307049 A1 | 10/2015 | Kwon |
| 2015/0360635 A1 | 12/2015 | Thomas |

FOREIGN PATENT DOCUMENTS

| | | |
|---|---|---|
| JP | 0621161 A | 8/1994 |
| JP | 2001310697 A | 11/2001 |
| JP | 2002220024 A | 8/2002 |
| JP | 2008068487 A | 3/2008 |
| JP | 4523182 B2 | 8/2010 |
| JP | 5098850 B2 | 12/2012 |
| WO | WO-2008029253 A2 * | 3/2008 ........... B60R 13/025 |

OTHER PUBLICATIONS

English Machine Translation of JP2002220024A dated Aug. 6, 2002.
Office action dated Apr. 8, 2019 for U.S. Appl. No. 16/042,506, filed Jul. 23, 2018.
English Machine Translation of JP2002220024A also published as JP4523182B2.
English Machine Translation of JP2010006289A also published as JP5098850B2.
English Machine Translation of JP2008068487A.
English Machine Translation of JP06211161A.
English Machine Translation of JP2001310697A.
Office Action dated Jun. 5, 2019 for U.S. Appl. No. 16/042,506, filed Jul. 23, 2018.
Office Action dated Jan. 2, 2020 for Application No. CN2016107891788, filed Aug. 31, 2016.
English Machine Translation of CN101412390A dated Apr. 22, 2009.

* cited by examiner

SIDE PILLAR AIR CURTAIN GUIDE WITH AIR CURTAIN INSERT HAVING A PLURALITY OF RIBS

This application is a divisional of prior U.S. patent application Ser. No. 14/846,101 filed on Sep. 4, 2015, the full disclosure of which is incorporated herein by reference.

TECHNICAL FIELD

This document relates generally to air curtain systems for protecting vehicle occupants in side impacts and, more particularly, to a side pillar air curtain guide incorporating a ramp for guiding the air curtain over the center or B-pillar assembly of the vehicle.

BACKGROUND

Air curtains protecting occupants of a vehicle from side impacts are well known in the art. Typically such systems include an air curtain guide incorporating a ramp to direct the trajectory of the inflating curtain so that it does not contact the upper edge of the center or B-pillar trim during deployment. This is done to minimize any possibility of the pillar trim becoming detached and preventing the curtain from achieving its intended "deployed" position from which it may provide maximum safety benefit.

Side air pillar curtain guides are typically very rigid in order to provide the desired ramp function when contacted by the rapidly inflating air curtain. In contrast to the required strength to withstand the initial impact and guide the inflating air curtain, the air curtain guide must also incorporate energy absorbing countermeasures in the event of a head impact so as to minimize potential injury to a vehicle occupant. In the past, these countermeasures have typically occupied space behind the headliner that drives the surface of the headliner into the interior of the cabin compromising the interior roominess of the vehicle.

This document relates to a side pillar air curtain guide that provides the necessary strength for properly guiding a rapidly inflating air curtain while also providing the desired energy absorbing characteristics necessary to minimize head injury in the event of a head impact. Further this is achieved in a compact structure which allows the possibility of maximizing the interior room of the passenger compartment of the vehicle.

SUMMARY

In accordance with the purposes and benefits described herein, a side pillar air curtain guide is provided. The guide includes a main body including a ramp receiver and an air curtain ramp insert connected to the ramp receiver. The main body is made from a first material having a strength $S_1$ and a ductility $D_1$. In contrast, the air curtain ramp insert is made from a second material having a strength $S_2$ and a ductility $D_2$ where $S_1 > S_2$ and $D_1 < D_2$.

In one possible embodiment, the main body includes a ramp apron and the receiver is adjacent to and below the ramp apron. The ramp apron has a first air curtain guide surface and the air curtain ramp insert has a second air curtain guide surface aligned with the first air curtain guide surface. The air curtain ramp insert complies with FMVSS201 requirements for head impact.

In one possible embodiment, the air curtain ramp insert includes a plurality of ribs projecting from the main body at an acute included angle with the main body. That acute included angle may be between 10 degrees and 60 degrees. Alternatively, it may be between 30 degrees and 40 degrees.

In another possible embodiment, the air curtain ramp insert includes a honeycomb array. That array may have an X-axis or fore-aft dimension of 4-7 honeycomb cells or 120-130 mm and a Y-axis or cross vehicle dimension of 1-2 honeycomb cells or 20-25 mm. The honeycomb array may also have a Z-axis dimension or thickness of 1.5-2.5 mm. The X-dimension is parallel to a face of the ramp receiver and the Y-dimension is perpendicular to the face of the ramp receiver. Each honeycomb cell may have six sides and each side may be 6 mm in length.

In still another embodiment the air curtain ramp insert includes a plurality of honeycomb arrays wherein the honeycomb arrays are separated by gaps to insure greater deformability of the air curtain ramp insert.

In one possible embodiment, the ramp receiver includes a recess. In one possible embodiment, the second material is closed cell rubber foam. In yet another possible embodiment, the second material is a high performance closed cell plastic foam.

In accordance with an additional aspect, a side pillar air curtain guide is provided that comprises a main body including a ramp receiver and an air curtain ramp insert connected to the main body. That air curtain ramp insert has a honeycomb construction.

The honeycomb cells of that honeycomb construction are aligned in a vertical plane when the side pillar air curtain guide insert is in an operative position connected to the main body. Further, the honeycomb cells are aligned parallel to a face of the ramp receiver.

In the following description, there are shown and described multiple embodiments of the side pillar air curtain guide. As it should be realized, the side pillar air curtain guide is capable of other, different embodiments and its several details are capable of modification in various, obvious aspects all without departing from the guide as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the air curtain guide and together with the description serve to explain certain principles thereof. In the drawing figures.

Figure 5:
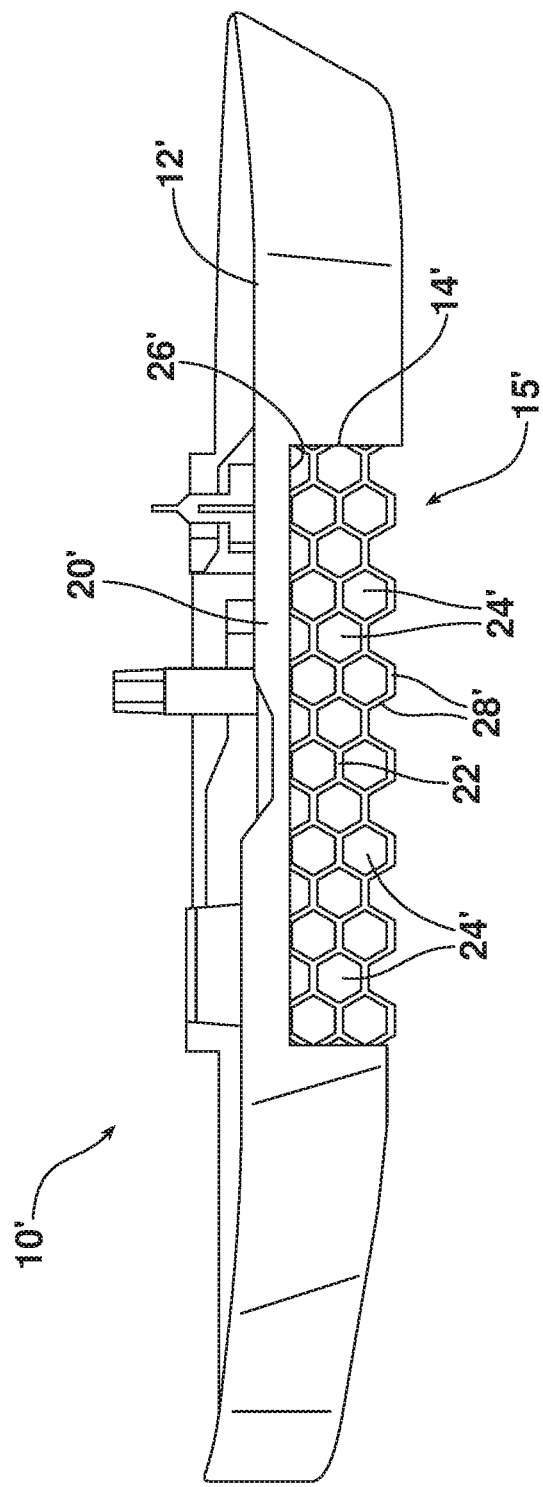
FIG. 5 is a top plan view of the second embodiment of side pillar air curtain guide.
Figure 6:
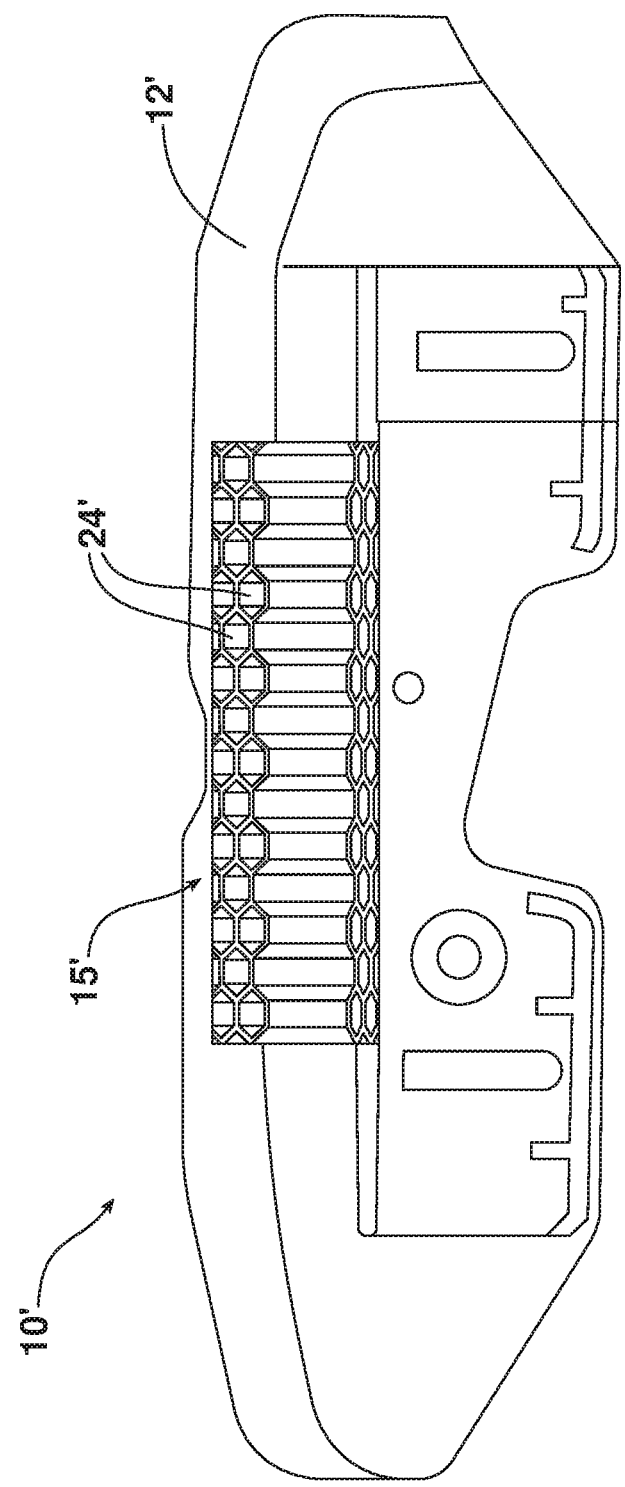
FIG. 6 is a front elevational view of the second embodiment.
Figure 7:
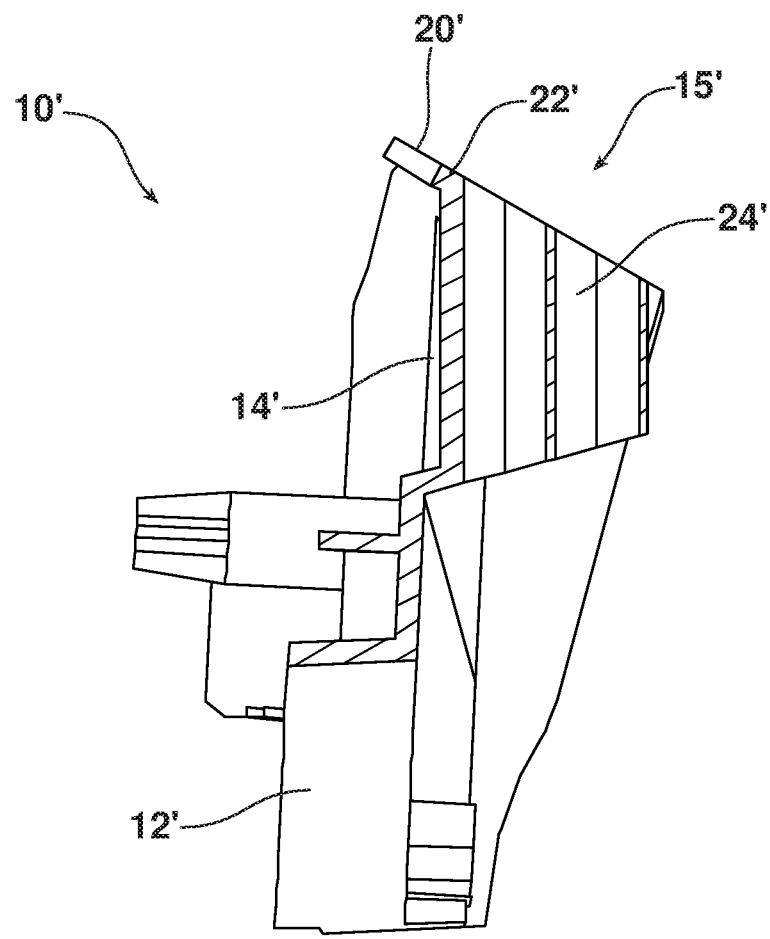
FIG. 7 is a cross-section view defined by the section line A-A of the embodiment illustrated in FIG. 5.
Figure 8:
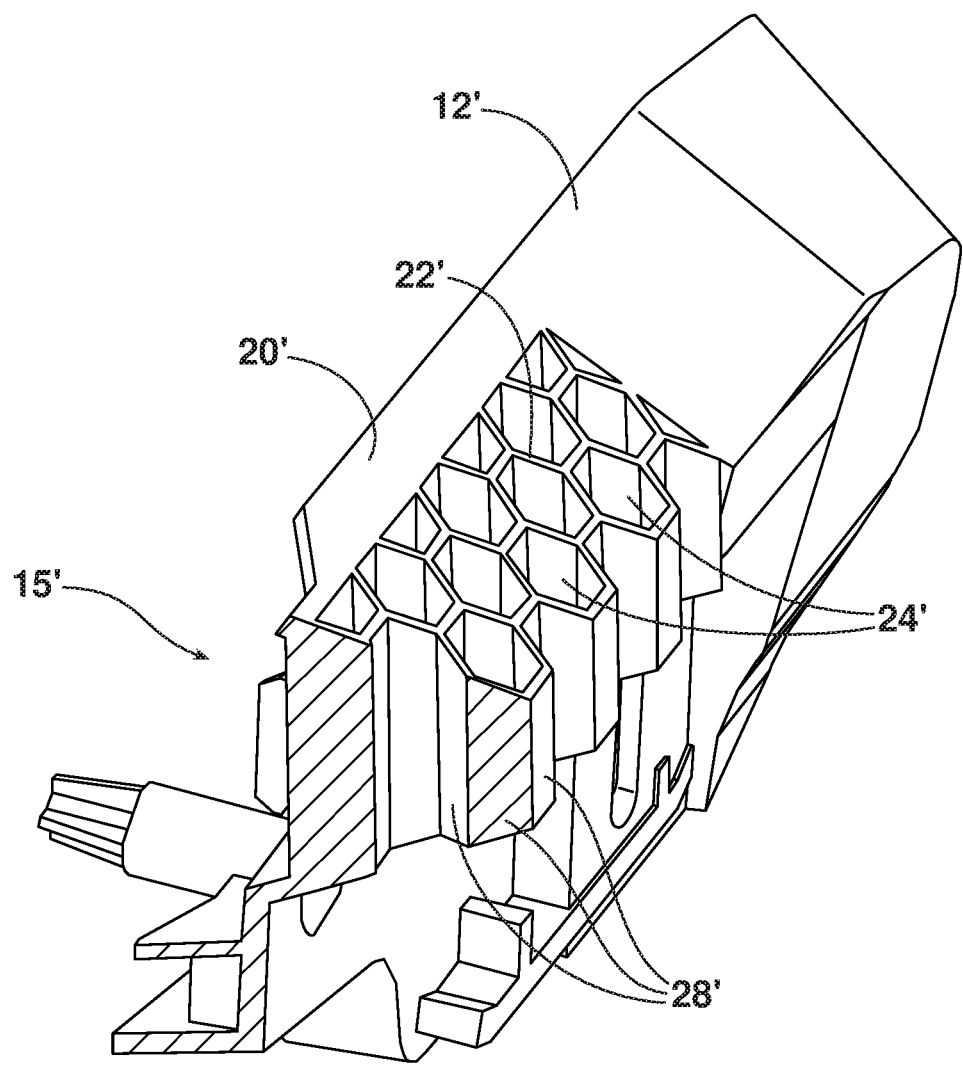
FIG. 8 is an isometric cross-sectional view of the embodiment illustrated in FIG. 5.
Figure 9:
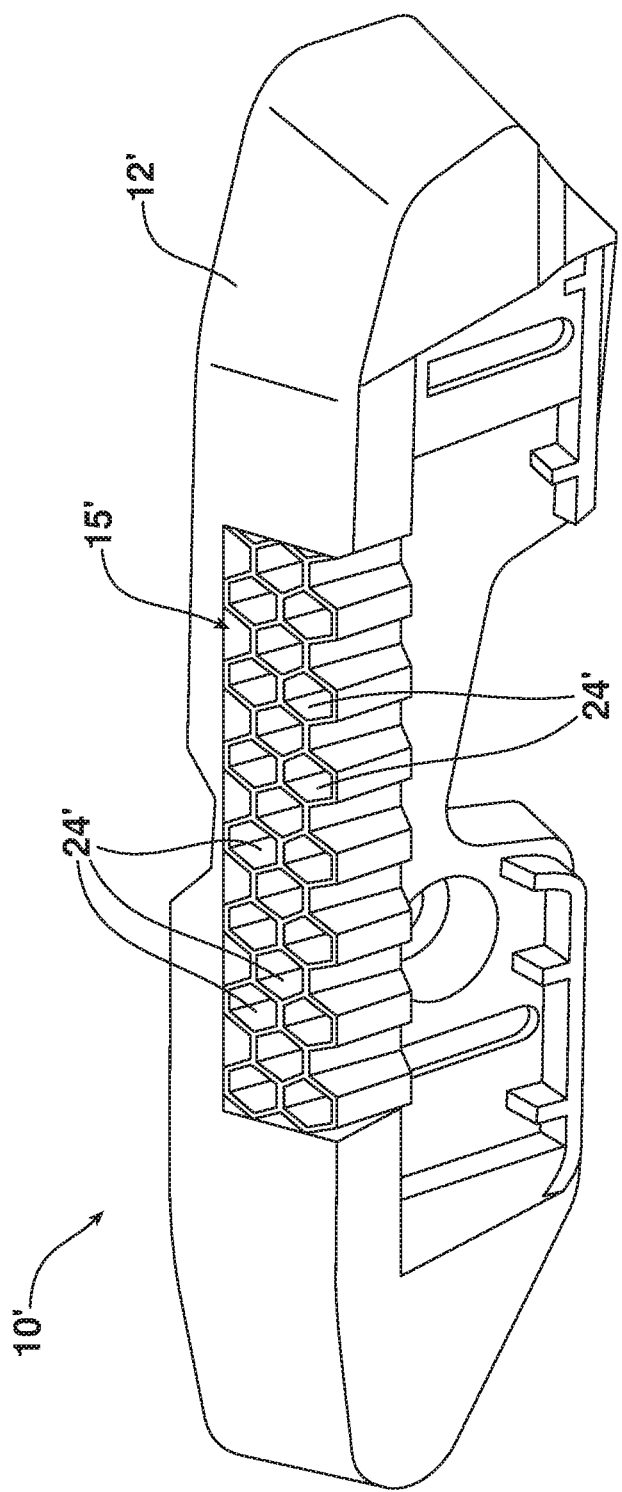
FIG. 9 is another isometric view of the embodiment illustrated in FIG. 4.
Figure 10:
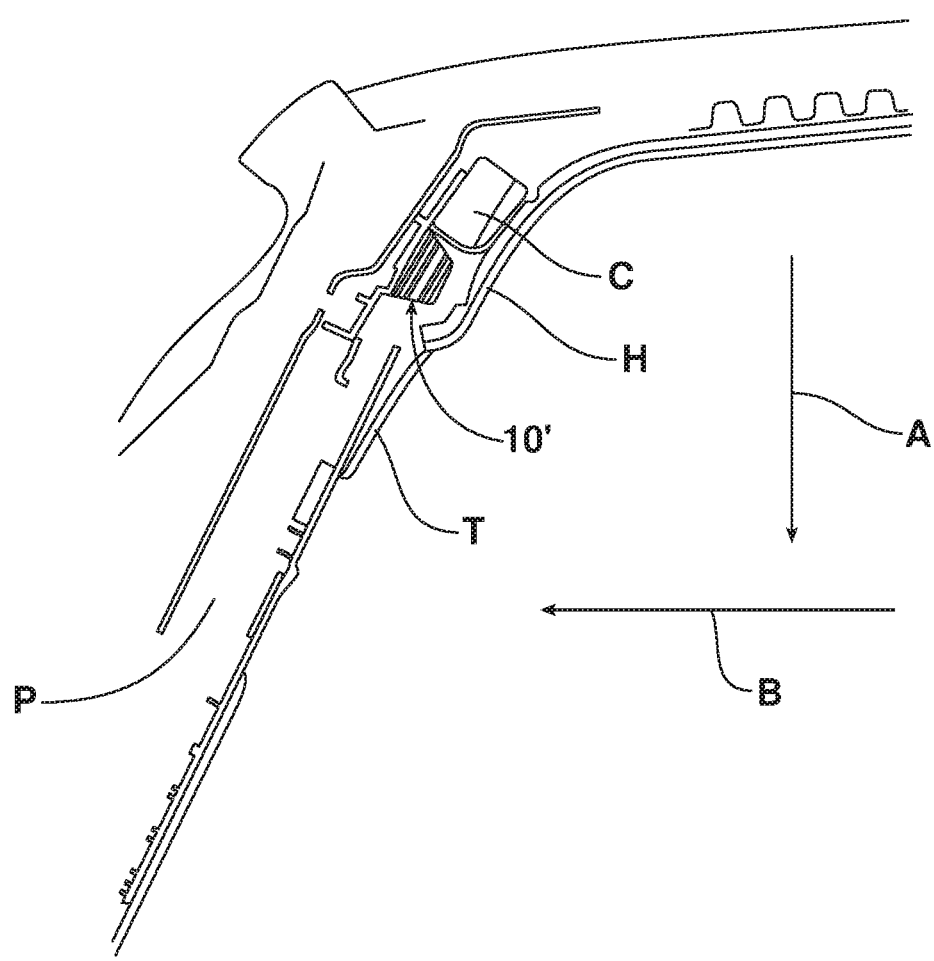
Figure 11:
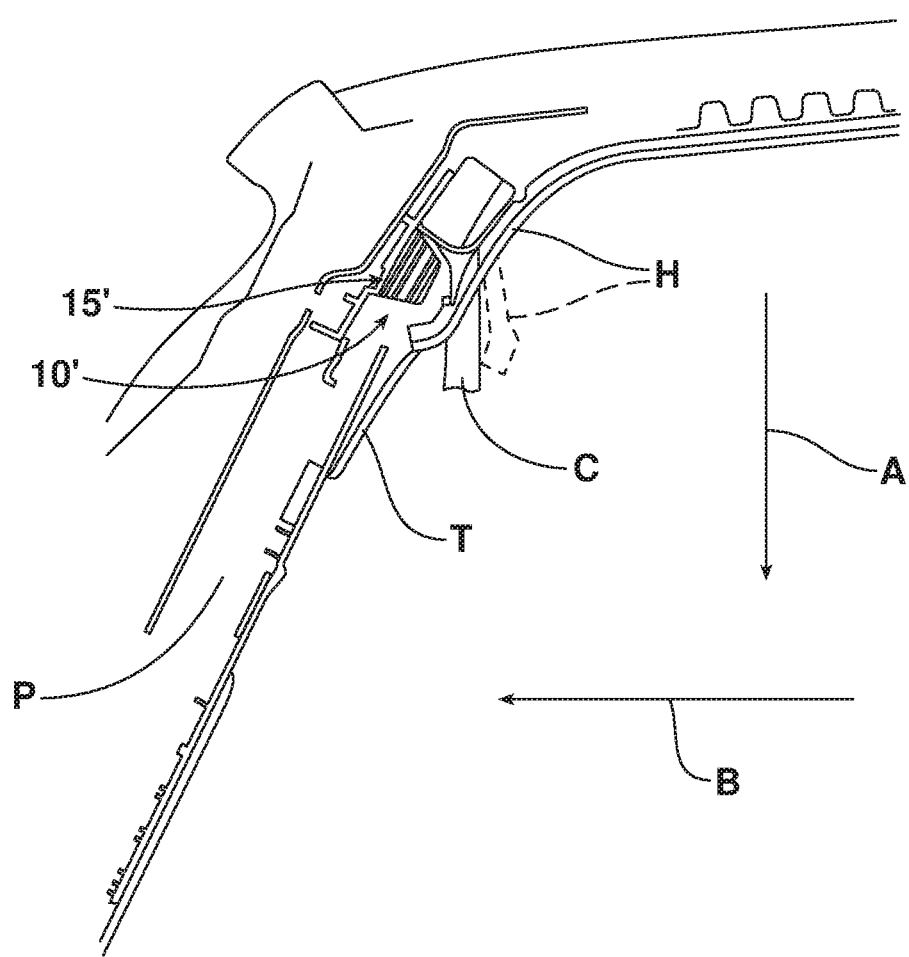

FIGS. 10-11 schematically illustrate the deployment of a side curtain over the air curtain guide illustrated in FIGS. 5-7.

Figure 12:
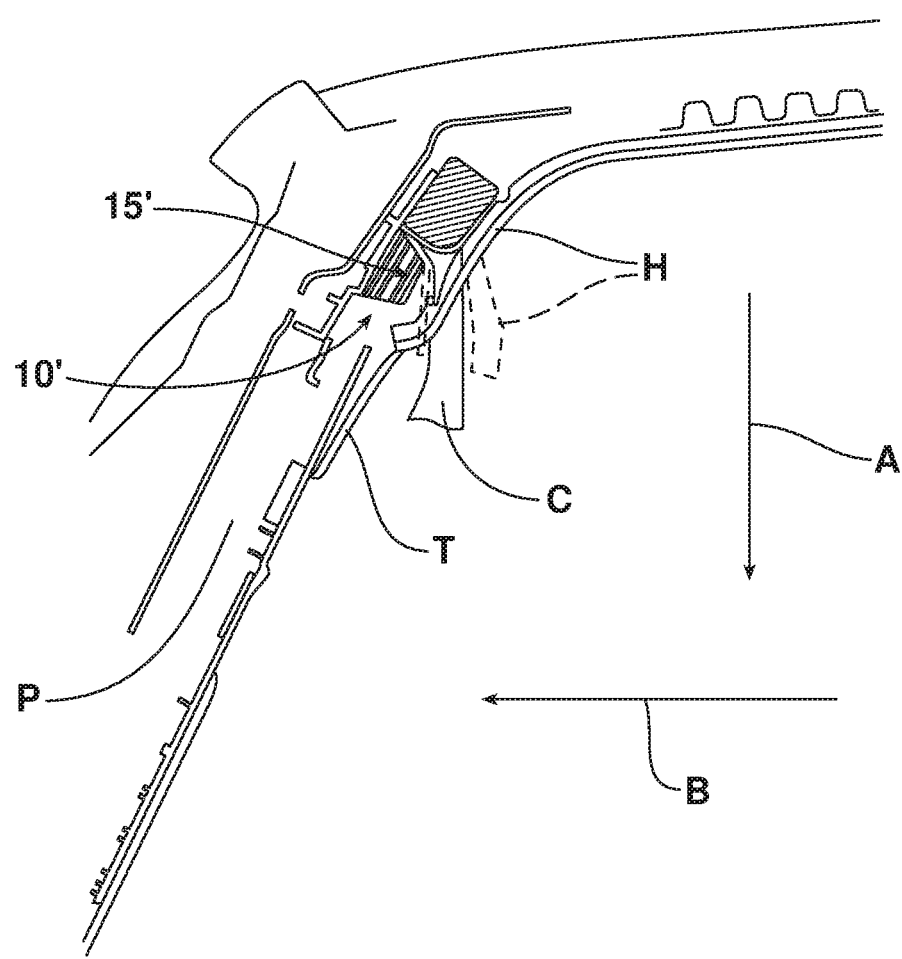
Figure 13:
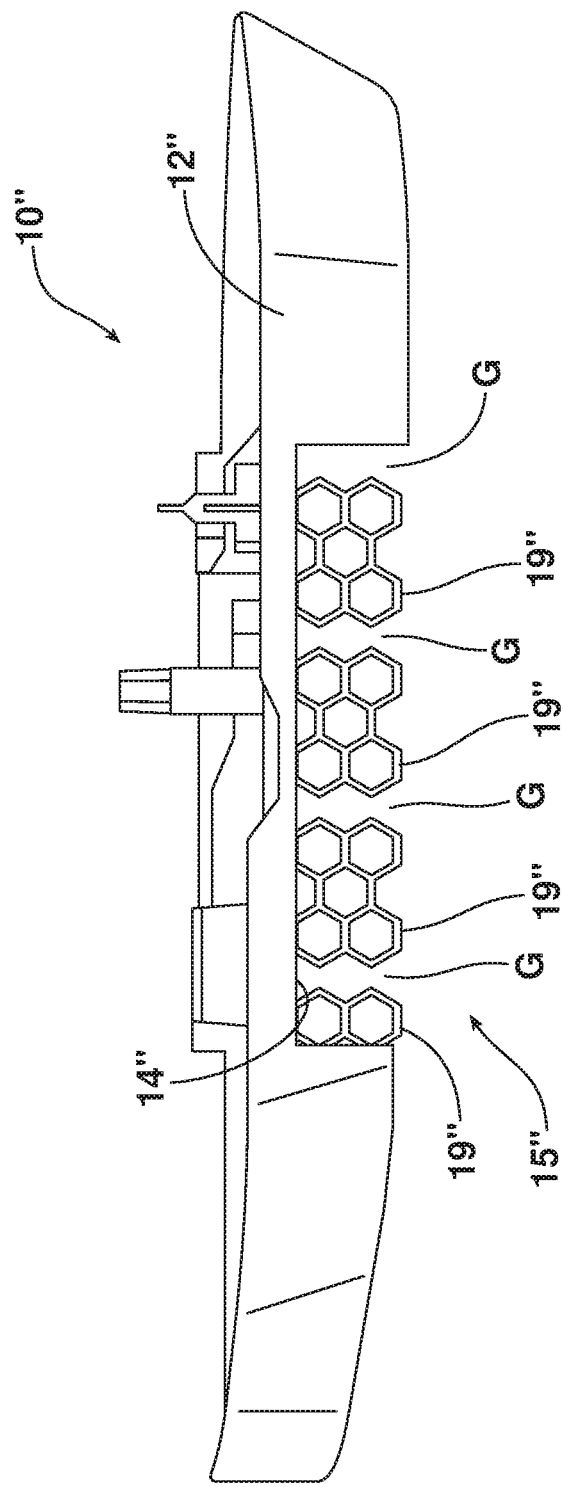

FIG. 12 is a transverse cross-sectional view of a side curtain over the air curtain guide illustrated in FIG. 13.

FIG. 13 is a front elevational view of a third embodiment of side pillar air curtain guide, where the array is divided into three different honeycomb sections.

Figure 14:
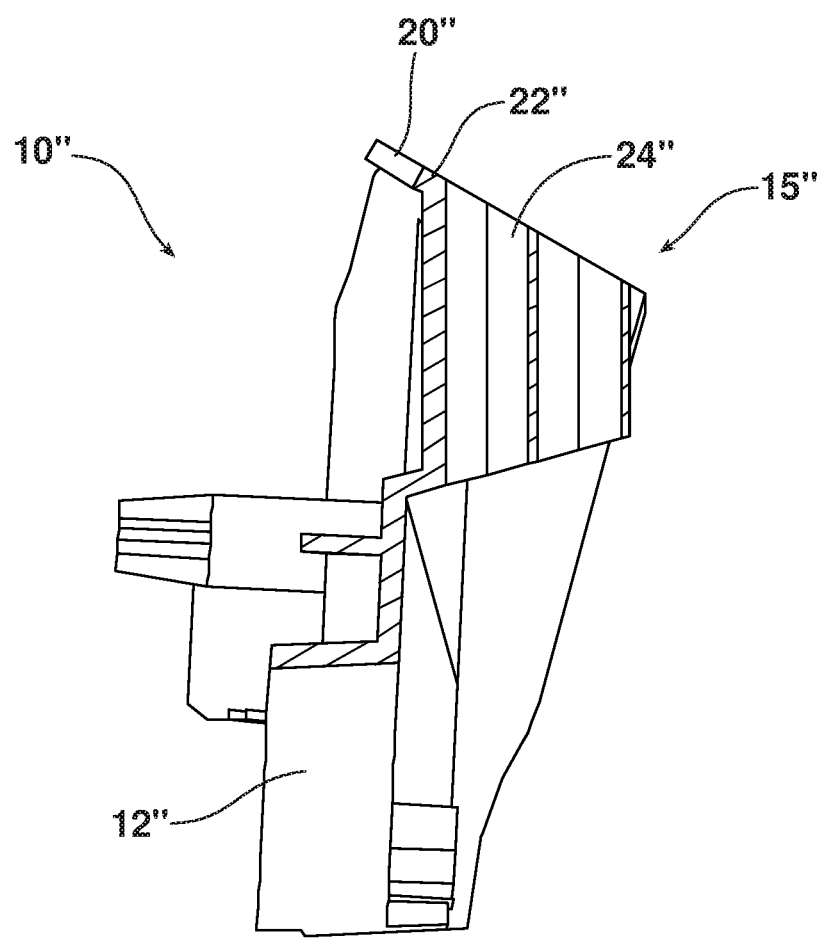

FIG. 14 is a cross-sectional view taken along section line B-B of FIG. 13.

Reference will now be made in detail to the present preferred embodiments of the guide, examples of which are illustrated in the accompanying drawings.

DETAILED DESCRIPTION

Figure 1:
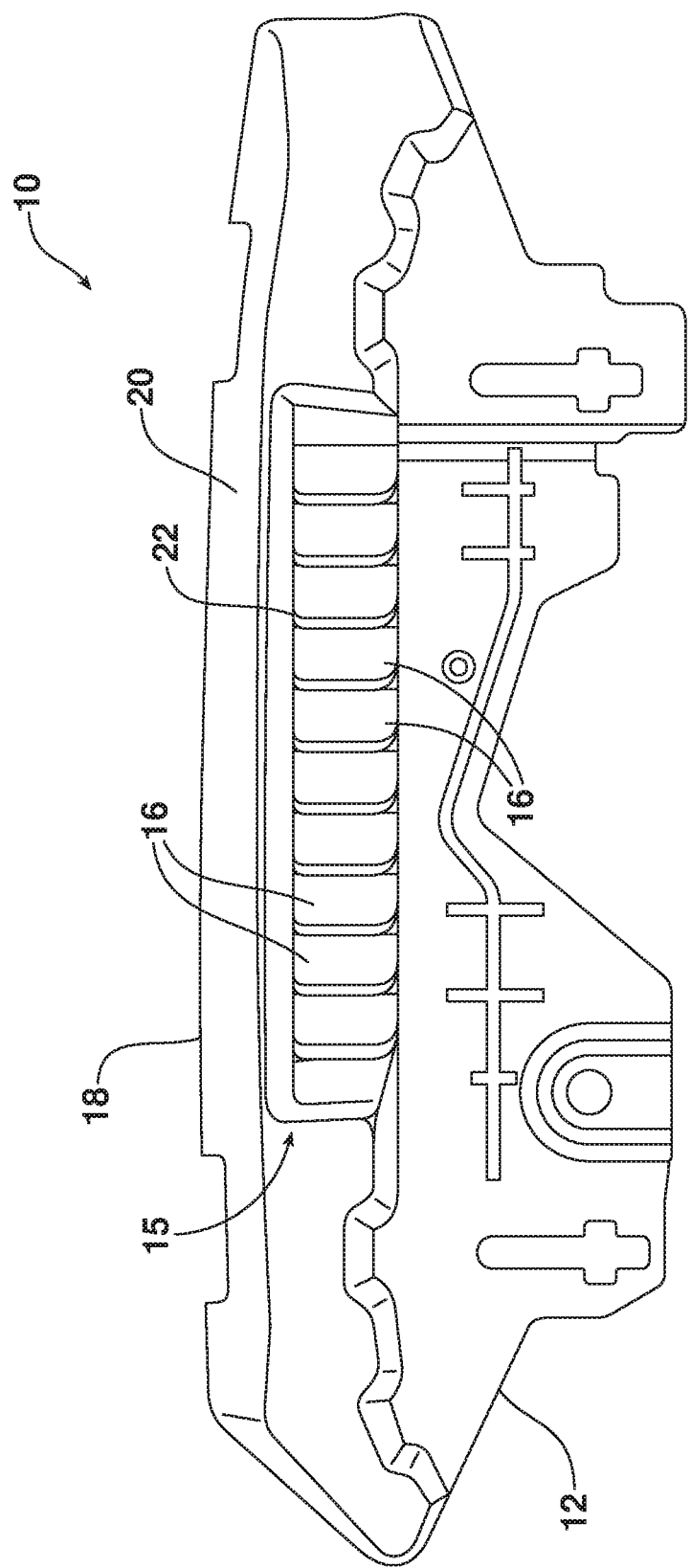
FIG. 1 is a front elevational view of a first embodiment of a side pillar air curtain guide including a main body and an air curtain ramp insert.
Figure 2:
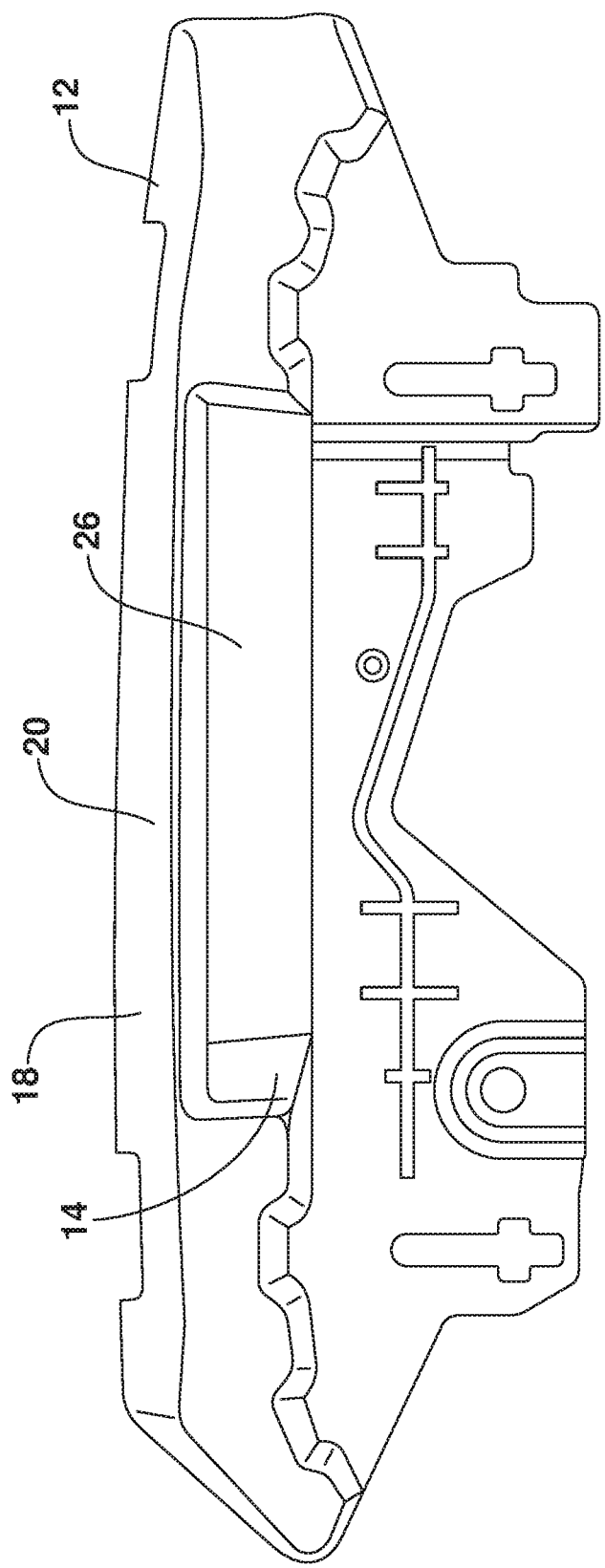
FIG. 2 is a front elevational view of the main body of the embodiment illustrated in FIG. 1 showing the ramp receiver recess.
Figure 3:
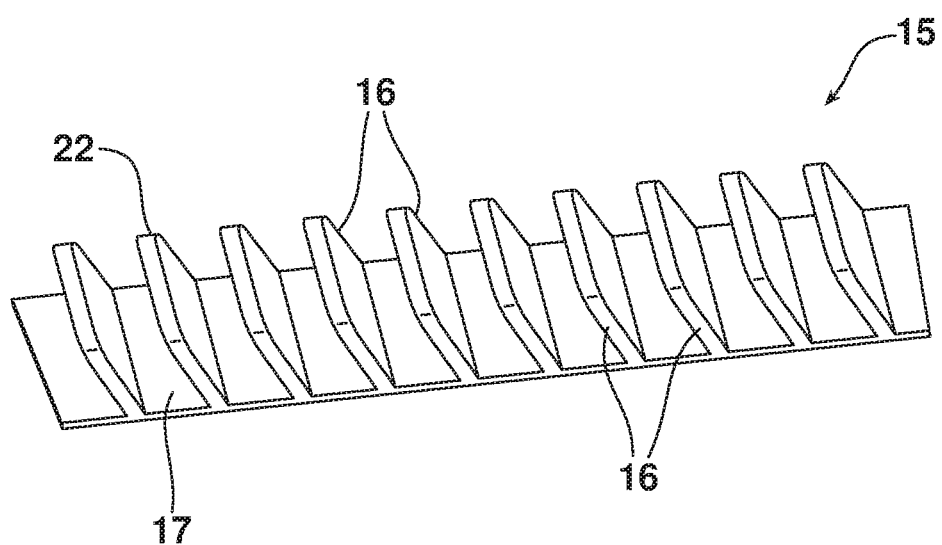
FIG. 3 is a perspective view of the air curtain ramp insert received in the ramp receiver recess of the main body illustrated in FIG. 1.
Figure 4:
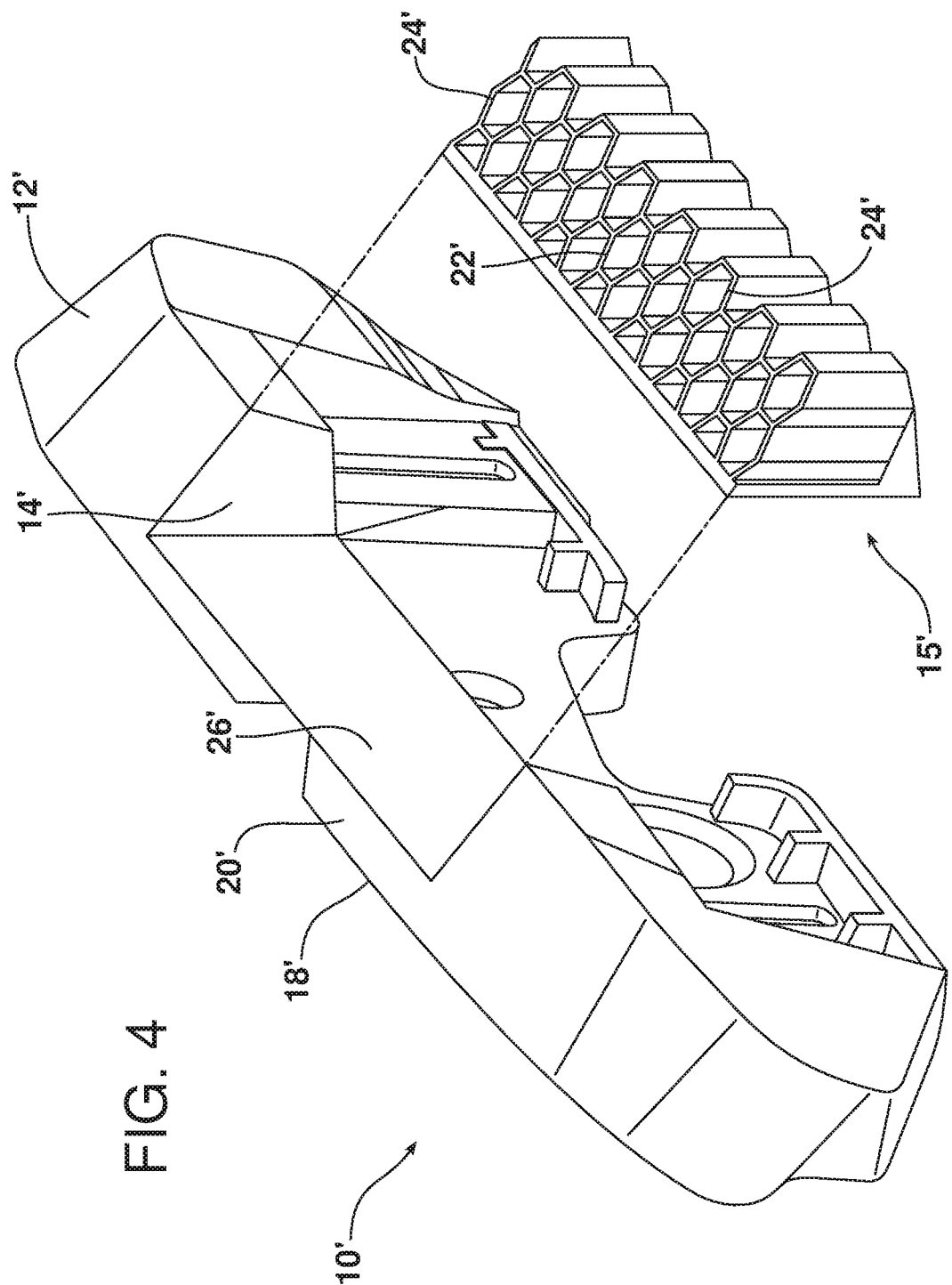
FIG. 4 is a perspective view of a second embodiment of side pillar air curtain guide including a main body and an air curtain ramp insert of honeycomb construction.

Reference is now made to FIGS. 1-3 illustrating a first embodiment of the side pillar air curtain guide 10. The guide 10 includes a main body 12 incorporating a ramp receiver 14 in the form of a lateral recess. An air curtain ramp insert 15 is received and held in the ramp receiver 14 on the body 12. The air curtain ramp insert 15 includes a plurality of ribs 16 that project from a mounting base 17. Significantly, the ribs 16 project from the base 17 and the main body 12 of the assembled guide 10 at an acute and included angle so that they are characterized by enhanced deformability which provides desirable energy absorbing characteristics in the event of an impact with a head of a vehicle occupant.

In one possible embodiment the acute included angle is between 10 degrees and 60 degrees. In another possible embodiment the acute included angle is between 30 degrees and 40 degrees. In yet another possible embodiment the acute included angle is about 30 degrees.

As further illustrated, the main body 12 includes a ramp apron 18. The ramp receiver 14 is adjacent to and just below the ramp apron 18. The ramp apron 18 includes a first air curtain guide surface 20 and the air curtain ramp insert 15 includes a second air curtain guide surface 22 formed by the upper edges of the ribs 16. The two surfaces 20, 22 are aligned when the air curtain ramp insert 15 is properly seated in the ramp receiver 14 and connected to the main body 12 by ultrasonic welding or other appropriate means.

Significantly, the main body 12 is made from a first material having a strength $S_1$ and a ductility $D_1$. In contrast, the air curtain ramp insert 15 is made from a second material having a strength $S_2$ and a ductility $D_2$ where $S_1 > S_2$ and $D_1 < D_2$. In one possible embodiment, the main body 12 is made from polycarbonate-acrylonitrile butadiene styrene (PC-ABS) and the air curtain ramp insert 15 is made from polypropylene. In another, the air curtain ramp insert is made from closed cell rubber foam with compressive strength between 60 kPa and 200 kPa at 25% strain. In yet another possible embodiment, the air curtain ramp insert is made from a closed cell plastic foam with compressive strength between 90 kPa and 200 kPa at 25% strain.

Of course, it should be appreciated that other materials may be utilized. In one particularly useful embodiment, the first material from which the main body 12 is made has a strength $S_1$ of between about 40 MPa and about 60 MPa and a ductility $D_1$ inherent to materials within the range specified for S1 and that are suitable for automotive applications. In contrast, the second material from which the air curtain ramp insert 15 is made has a strength $S_2$ of between about 60 kPa and about 20 MPa and a ductility $D_2$, generally greater than D1. Due to Interior Head Impact requirement is not only dependable of stiffness of the ramp insert 15 but also dependable of the kinematics generated by the interaction between the Free Motion Head and the vehicle interior components, the main mechanical parameter the air curtain ramp insert defined herein must meet is energy absorption based on compressive stress from 0.25 MPa to 0.80 MPa with a compressive strain with a range of 0.60 to 0.75 mm/mm under a quasi-static Crush Testing.

Reference is now made to FIGS. 4-12 illustrating a second embodiment of side pillar air curtain guide 10' including: (a) a main body 12' having a ramp receiver 14' and a ramp apron 18' and (b) an air curtain ramp insert 15' of honeycomb construction. Significantly, the honeycombed air curtain ramp insert 15' provides desirable energy absorbing characteristics in the event of an impact with a head of a vehicle occupant. As in the previous embodiment described above, the air curtain ramp insert 15' is nested into the ramp receiver 14' and ultrasonic welded or otherwise secured to the main body 12'. When properly seated, the first air curtain guide surface 20' of the ramp apron 18' is aligned with the second air curtain guide surface 22' formed by the honeycomb cells 24' of the air curtain ramp insert 15'.

The honeycomb array of the air curtain ramp insert 15' may have an X-axis dimension, parallel to a face 26' of the ramp receiver 14' and running in a motor vehicle fore-aft direction, of between 4-7 honeycomb cells 24' about 120-130 mm in length and a Y-axis dimension, perpendicular to the face 26' and running in a cross vehicle direction, of 1-2 honeycomb cells about 20-25 mm in length. The honeycomb array may have a height or Z-axis dimension of between about 1.5-2.5 mm. The honeycomb cells 24' of the honeycomb array are aligned in a vertical plane (Z-direction) when the side pillar air curtain ramp insert 15' is in an operative position connected to the main body 12'. Each honeycomb cell 24' of the honeycomb array may have six sides 28' and each side may be, for example, 6 mm in length.

Reference is now made to FIGS. 10-12 illustrating the deployment of a side air curtain C over the guide 10'. As illustrated the guide 10' is mounted to the vehicle center side pillar P (the B-pillar) between the front and rear doors so as to overlie the pillar trim T. The undeployed side curtain C is positioned overlying the guide 10' and both the side curtain C and guide 10' are hidden from view by the headliner H. As indicated in FIG. 11, in the event of a side impact, the side curtain C is deployed. As the side curtain C is rapidly inflated, it engages and is guided by the guide 10' including the first air curtain guide surface 20' of the ramp apron 18' and the second air curtain guide surface 22' formed by the top edges of the air curtain ramp insert 15'. As should be appreciated, the ramp insert 15' strongly resists any deflection when engaged by the inflating side curtain C along the inclined portions of the top edge. Thus, the inflating curtain C is guided over the pillar trim T by the guide 10' forcing a gap between the pillar trim T and the headliner H through which the curtain is deployed into its functional and desired position for maximum benefit to the vehicle occupants. While the ramp insert 15' strongly resists deflection in a vertical direction (see FIG. 12 and note action arrow A) so as to properly guide the inflating curtain C over the pillar trim T, the honeycomb cells 24' of the ramp insert are very deformable in a horizontal direction (note also action arrow B) so as to cushion any head impact that might occur at other times.

Reference is now made to FIGS. 13 and 14 illustrating another alternative embodiment of a ramp insert 15" including the side pillar air curtain guide 10″. The guide 10″ includes a main body 12″ having a ramp receiver 14″ and a plurality of honeycomb arrays 19″ held in the receiver. In contrast to the second embodiment of the guide 10′ illustrated in FIGS. 4-12, the third embodiment of guide 10″ includes four honeycomb arrays 19″ that do not engage each other. In one possible embodiment, the four honeycomb arrays 19″ are spaced from each other by a gap G having a width of 6.0-7.0 mm. This spacing between honeycomb arrays 17″ ensures greater deformability in the horizontal direction (the Y-axis) so that the ramp insert 15″ can absorb more energy in the event of a head impact by a vehicle occupant.

In summary, numerous benefits result from employing the illustrated embodiments of the side pillar air curtain guides 10, 10′, 10″. Significantly all three embodiments 10, 10′, 10″ incorporate a main body 12, 12′, 12″ made from a first material with strength $S_1$ and ductility $D_1$ tuned to provide desired properties for mounting the guide to the B-pillar. In addition all three embodiments 10, 10′, 10″ incorporate a ramp insert 15, 15′, 15″ made from a second material tuned to provide desired properties including the necessary rigidity in the vertical direction to receive and guide the rapidly inflating air curtain C over the side pillar trim T so that the curtain is received in its desired deployed position where it can protect occupants of the vehicle from side impact. At the same time, the ramp inserts 15, 15′, 15″ provide significant deformability in the horizontal direction so that they can absorb energy in the event of a head impact by an occupant of a vehicle. Advantageously, the use of two different materials for the main body 12, 12′, 12″ and the ramp insert 15, 15′, 15″ substantially eliminate performance compromises and result in a better performing product. The incorporation of the honeycomb construction into the ramp inserts 15′, 15″ also allows for performance tuning to meet design goals including FMVSS201 requirements.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A side pillar air curtain guide, comprising:
a main body including a ramp receiver and a ramp apron, said ramp receiver being adjacent to and below said ramp apron; and
an air curtain ramp insert held in said ramp receiver, said air curtain ramp insert including a plurality of exposed ribs projecting away from said main body at an acute included angle between 10 degrees and 60 degrees with said main body wherein said ramp apron has a first air curtain guide surface and said air curtain ramp insert has a second air curtain guide surface aligned with said first air curtain guide surface.

2. The side pillar air curtain guide of claim 1, wherein said main body is made from a first material having a strength $S_1$ and a ductility $D_1$.

3. The side pillar air curtain guide of claim 2, wherein said air curtain ramp insert is made from a second material having a strength $S_2$ and a ductility $D_2$ where $S_1 > S_2$ and $D_1 < D_2$.

4. The side pillar air curtain guide of claim 3, wherein said second material is a closed cell rubber foam having a compressive strength between about 60 kPa and about 200 kPa at 25% strain.

5. The side pillar air curtain guide of claim 3, wherein said second material is a high performance plastic foam with a compressive strength between about 90 kPa and about 200 kPa at 25% strain.

6. The side pillar air curtain guide of claim 1, wherein said main body is made from a first material having a strength $S_1$ and a ductility $D_1$.

7. The side pillar air curtain guide of claim 6, wherein said air curtain ramp insert is made from a second material having a strength $S_2$ and a ductility $D_2$ where $S_1 > S_2$ and $D_1 < D_2$.

8. The side pillar air curtain guide of claim 7, wherein said second material is a closed cell rubber foam having a compressive strength between about 60 kPa and about 200 kPa at 25% strain.

9. The side pillar air curtain guide of claim 7, wherein said second material is a high performance plastic foam with a compressive strength between about 90 kPa and about 200 kPa at 25% strain.

10. A side pillar air curtain guide, comprising:
a main body including a ramp receiver and a ramp apron, said ramp receiver being adjacent to and below said ramp apron; and
an air curtain ramp insert held in said ramp receiver, said air curtain ramp insert including a plurality of exposed ribs projecting away from said main body at an acute included angle between 30 degrees and 40 degrees with said main body wherein said ramp apron has a first air curtain guide surface and said air curtain ramp insert has a second air curtain guide surface aligned with said first air curtain guide surface.

\* \* \* \* \*